United States Patent
Liu

(10) Patent No.: US 11,036,587 B2
(45) Date of Patent: Jun. 15, 2021

(54) METHOD, APPARATUS, AND COMPUTER PROGRAM PRODUCT FOR MANAGING STORAGE SYSTEM USING PARTIAL DRIVE FAILURE PREDICTION

(71) Applicant: EMC IP Holding Company LLC, Hopkinton, MA (US)

(72) Inventor: Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 181 days.

(21) Appl. No.: 16/284,562

(22) Filed: Feb. 25, 2019

(65) Prior Publication Data
US 2020/0133778 A1 Apr. 30, 2020

(30) Foreign Application Priority Data
Oct. 26, 2018 (CN) .......................... 201811261807.5

(51) Int. Cl.
G06F 11/00 (2006.01)
G06F 11/10 (2006.01)
G06F 11/20 (2006.01)
G06F 3/06 (2006.01)
G06F 9/50 (2006.01)

(52) U.S. Cl.
CPC ........ *G06F 11/1092* (2013.01); *G06F 3/0619* (2013.01); *G06F 3/0644* (2013.01); *G06F 3/0653* (2013.01); *G06F 3/0689* (2013.01); *G06F 9/5016* (2013.01); *G06F 11/2094* (2013.01); *G06F 2209/5011* (2013.01)

(58) Field of Classification Search
None
See application file for complete search history.

(56) References Cited

U.S. PATENT DOCUMENTS

| 7,434,091 B1 * | 10/2008 | Karr ..................... G06F 3/0614 711/114 |
| 10,152,254 B1 * | 12/2018 | Kang .................... G06F 3/0647 |
| 2018/0088857 A1 * | 3/2018 | Gao ..................... G06F 11/1076 |
| 2019/0227872 A1 * | 7/2019 | Dalmatov ........... G06F 11/2094 |

OTHER PUBLICATIONS

NPL: Google Scholar/Patents search—see attached (Year: 2020).*
Google Scholar/Patents—text refined (Year: 2021).*

* cited by examiner

*Primary Examiner* — Christopher S McCarthy
(74) *Attorney, Agent, or Firm* — Chamberlain, Hrdlicka, White, Williams & Aughtry

(57) ABSTRACT

According to implementations of the present disclosure, there is provided a method for managing a storage system, extents in the storage system being from multiple storage devices in a resource pool associated with the storage system. In the method, regarding multiple extents comprised in a storage device among the multiple storage devices, respective service states of the multiple extents are obtained. Respective features of respective extents among the multiple extents are determined on the basis of respective service states of the multiple extents. An association relation between a failure in an extent in a storage device in the resource pool and a feature of the extent is obtained. A failure extent in which a failure is to be occurred is identified from the multiple extents on the basis of respective features of the multiple extents and the association relation.

18 Claims, 10 Drawing Sheets

METHOD, APPARATUS, AND COMPUTER PROGRAM PRODUCT FOR MANAGING STORAGE SYSTEM USING PARTIAL DRIVE FAILURE PREDICTION

FIELD

Various implementations of the present disclosure generally relate to storage management, and more specifically, to a method, apparatus and computer program product for managing various storage devices in a resource pool of a storage system.

BACKGROUND

With the development of data storage techniques, various data storage devices now provide users with increasingly large data storage capacity. A resource pool may include multiple such storage devices, and each of the multiple storage devices may include multiple extents. Extents may be allocated to a storage system, so that the storage system may utilize storage spaces of various storage devices in the resource pool.

It will be understood that due to the difference in service time and service state between various storage devices in the resource pool, these storage devices might have different wear degrees. Furthermore, service states of various portions in one storage device may also vary, and one part of the storage device might fail and cannot be used. Therefore, it is difficult to predict potential failure of various storage devices in the resource pool and further avoid data loss in the storage system.

SUMMARY

Therefore, it may be desirable to develop and implement a technical solution for managing a storage system more effectively.

According to a first aspect of the present disclosure, there is provided a method for managing a storage system. Extents in the storage system are from multiple storage devices in a resource pool associated with the storage system. In the method, regarding multiple extents comprised in a storage device among the multiple storage devices, respective service states of the multiple extents are obtained. Respective features of respective extents among the multiple extents are determined on the basis of respective service states of the multiple extents. An association relation between a failure in an extent in a storage device in the resource pool and a feature of the extent is obtained. A failure extent in which a failure is to be occurred is identified from the multiple extents on the basis of respective features of the multiple extents and the association relation.

According to a second aspect of the present disclosure, there is provided an apparatus for managing a storage system. Extents in the storage system are from multiple storage devices in a resource pool associated with the storage system. The apparatus comprises: at least one processor; a volatile memory; and a memory coupled to the at least one processor, the memory having instructions stored thereon, the instructions, when executed by the at least one processor, causing the apparatus to perform acts. The acts include: regarding multiple extents comprised in a storage device among the multiple storage devices, obtaining respective service states of the multiple extents; determining respective features of respective extents among the multiple extents on the basis of respective service states of the multiple extents; obtaining an association relation between a failure in an extent in a storage device in the resource pool and a feature of the extent; and identifying from the multiple extents a failure extent in which a failure is to be occurred on the basis of respective features of the multiple extents and the association relation.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

In the context of the present disclosure, the storage system may be a storage system based on Redundant Array of Independent Disks (RAID). The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exists a number of RAID standards, such as RAID-1, RAID-2, RAID-3, RAID-4, RAID-5, RAID-6, RAID-10, RAID-50, etc.

It will be understood although implementations for managing a storage system are described by taking a resource pool of a RAID-based storage system as an example in the context of the present disclosure, example implementations of the present disclosure may further be implemented in other resource pools that include multiple storage devices that are not using RAID. For example, data in various extents of the storage system here may not comprise redundant data. Further, in the context of the present disclosure, it is not intended to limit a function of the storage system, but the storage system described herein may be a general-purpose storage system or a customized storage system dedicated to a special purpose (e.g., backup service).

Figure 1A:
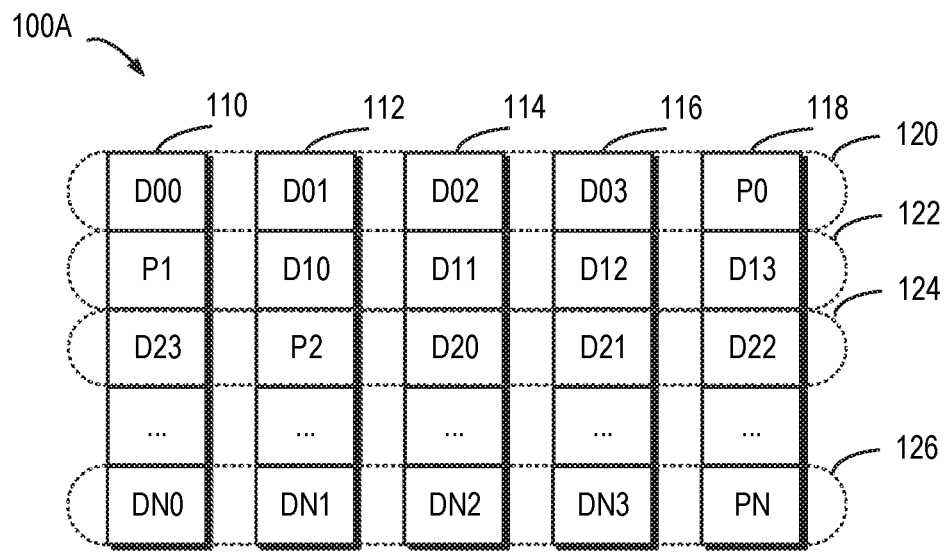
FIGS. 1A and 1B each illustrate a schematic view of a storage system in which a method of the present disclosure may be implemented.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that includes five independent storage devices (110, 112, 114, 116 and 118) as an example. It should be noted although five storage devices are schematically shown in FIG. 1A, in other implementations more or less storage devices may be used according to different levels of RAID. Moreover, although FIG. 1A illustrates stripes 120, 122, 124, . . . , 126, in other examples the RAID system may further comprise a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normally operating storage devices.

Figure 1B:
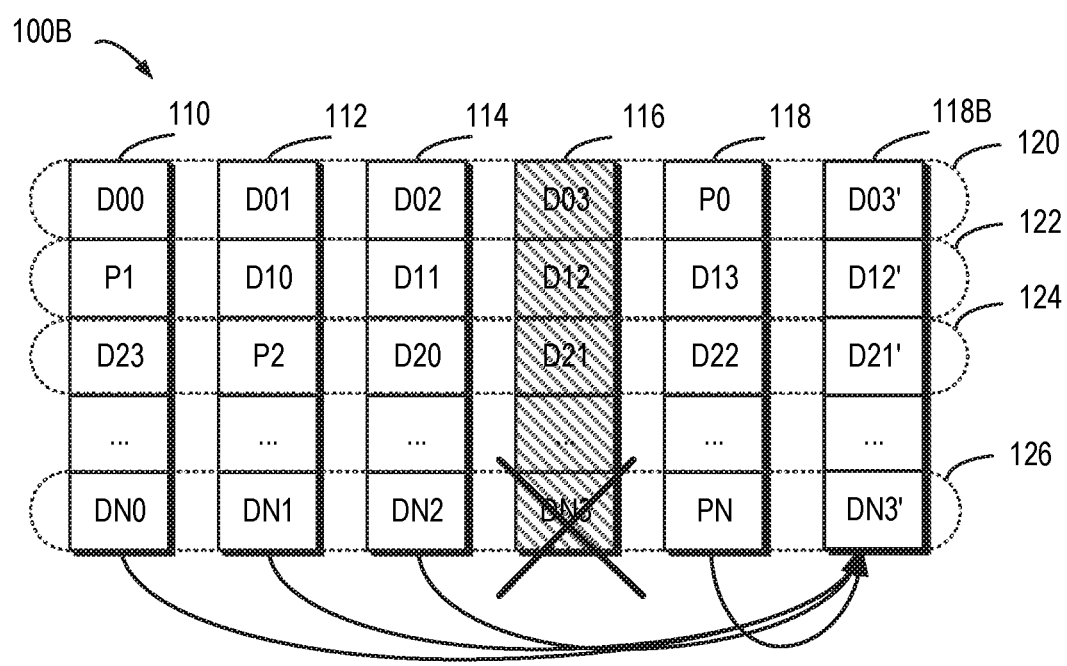

FIG. 1B schematically illustrates a schematic view 100B of rebuilding process of the storage system 100A. As shown in FIG. 1B, when one storage device (e.g. the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system includes 5 storage devices (among which 4 storage devices are used for storing data and 1 storage device is used for storing parity) has been described with reference to FIGS. 1A and 1B, according to definition of other RAID levels, there may further exist a storage system includes a different number of storage devices. On the basis of definition of RAID-6, for example, two storage devices may be used to store parity P and Q respectively. For another example, according to definition of triple-parity RAID, three storage devices may be used to store parity P, Q and R, respectively.

Figure 2:
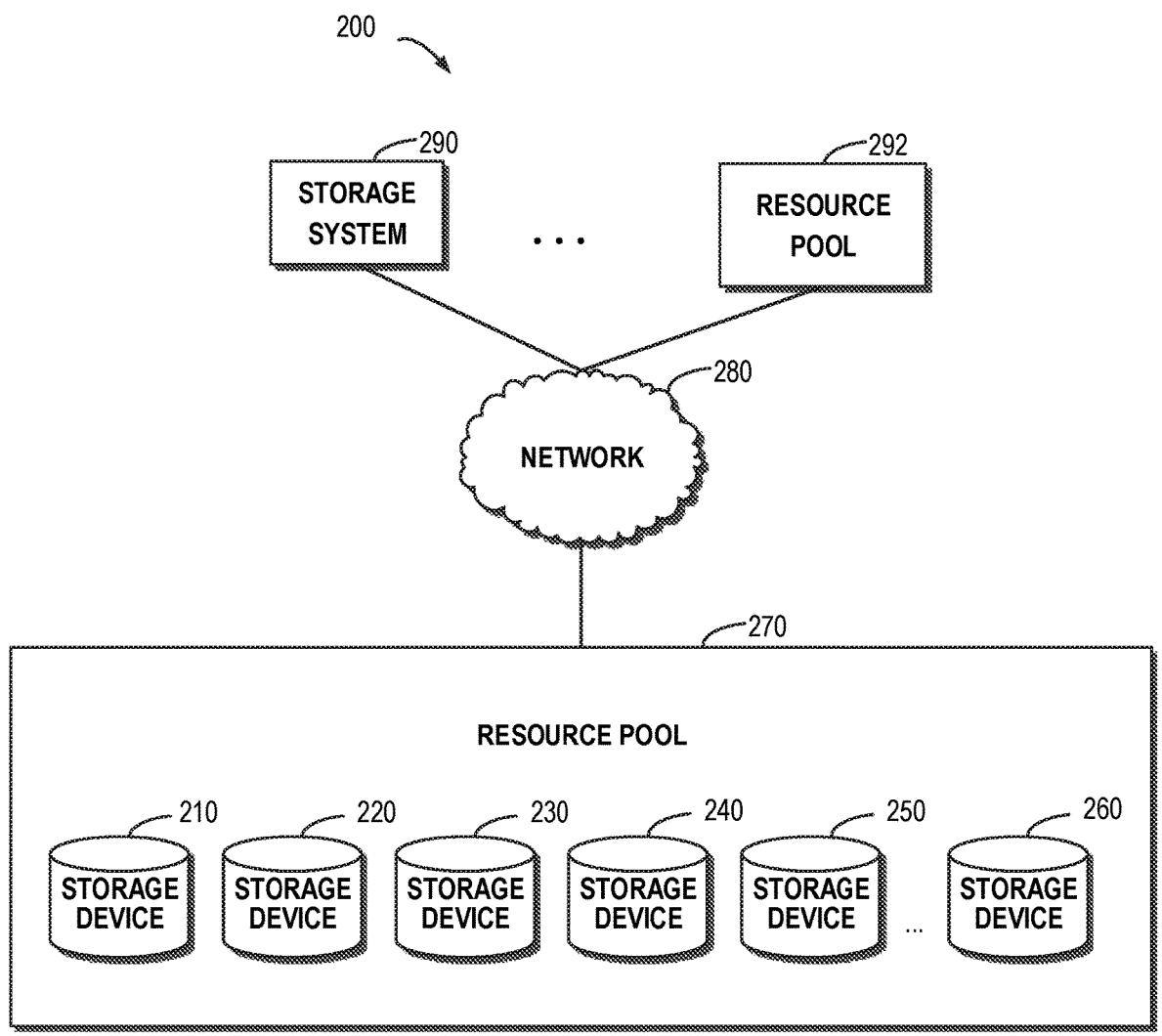
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices) in the resource pool. FIG. 2 schematically shows a block diagram of an example environment in which the method of the present disclosure may be implemented. As depicted, a storage resource pool 270 may comprise multiple physical storage devices 210, 220, 230, 240, 250, . . . , 260. At this point, storage space in the multiple storage devices may be allocated to multiple storage systems 290, . . . , 292. At this point, these storage devices 290, . . . , 292 may access the storage space in the various storage devices in the storage resource pool 270 via a network 280.

Figure 3:
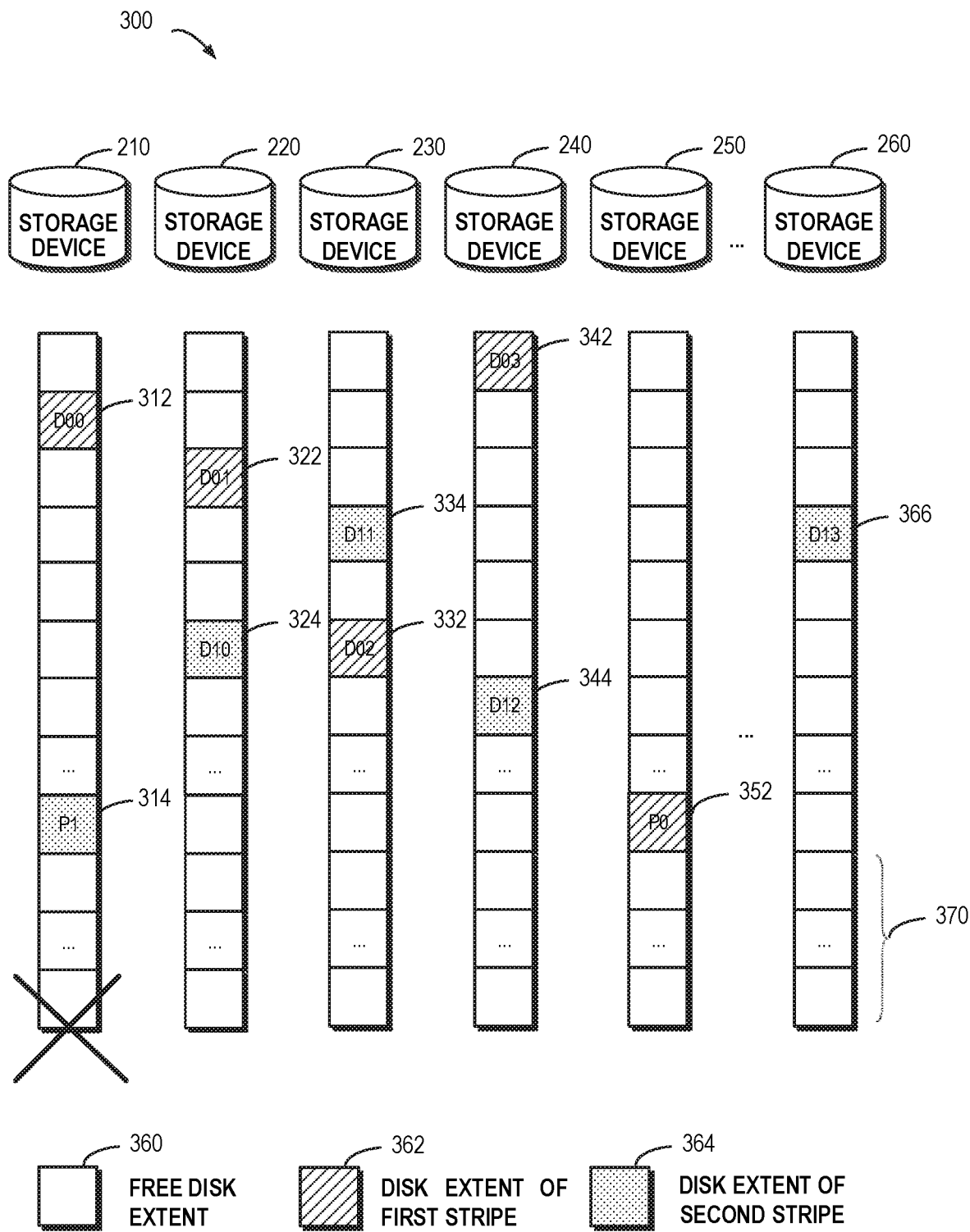
FIG. 3 schematically illustrates a diagram of a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, for example, a schematic view of extents included in each storage device is shown in the upper portion of the storage device. A blank extent (as shown by a legend 360) represents a free extent, an extent (as shown by a legend 362) shown with slashes represents an extent for a first stripe of the storage system 110A in FIG. 1, and a shaded extent (as shown by a legend 364) represents an extent for a second stripe of the storage system 110A in FIG. 1. At this point, extents 312, 322, 332, 342 and 352 for the first stripe are for storing data blocks D00, D01, D02, D03 and parity P0 of the first stripe, respectively. Extents 324, 334, 344, 366 and 314 for the second stripe are for storing blocks D10, D11, D12, D13 and parity P1 of the second stripe, respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3, the 4D+1P RAID-5 storage system is taken as an example to illustrate how extents in various stripes are distributed over multiple storage systems in the resource pool. When RAID based on another level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

It will be understood the storage devices 210 to 260 are not indefinitely usable but have specific service lives. When the wear level of a storage device reaches a certain degree, the storage device might enter the end of life. Technical solutions have been proposed to control wear levels of various storage devices in the storage resource pool 270, manage the storage resource pool 270 and further renew devices.

These technical solutions can ensure wear levels of various storage devices in the storage resource pool 270 are maintained at similar levels during use, and a potential failed storage device may be replaced with a normal storage device when entering the end of life. Nevertheless, during use of a storage device, one part of areas in the storage device might fail while other areas continue to operate normally. At this point, in prior art approaches, even if only a small part of the storage device fails, the whole storage device has to be replaced.

In order to solve the foregoing drawbacks, implementations of the present disclosure provide a method, apparatus and computer program product for managing a storage system. With implementations of the present disclosure, a failure in part of a storage device may be determined. Detailed description is presented below to specific implementations of the present disclosure. According to implementations of the present disclosure, provided is a technical solution for managing a storage system. Specifically, there is provided a method for managing a storage system, where extents in the storage system are from multiple storage devices in a resource pool associated with the storage system. In the method, regarding multiple extents included in a storage device among the multiple storage devices, respective service states of the multiple extents are obtained, respective features of the multiple extents are determined on the basis of the respective service states of the multiple extents; an association relation between a failure in an extent in a storage device in the resource pool and a feature of the extent is obtained, and a failure extent in which a failure is to be occurred is identified from the multiple extents on the basis of the respective features of the multiple extents and the association relation.

With the above example implementations, service states of the storage devices 210 to 260 in the resource pool 270 may be monitored, and it may be determined, on the basis of an association relation between a failure in an extent in a storage device and a feature of the extent, which extent/extents among the multiple extents might fail. In this way, failure identification may be performed to the partial area in the storage device. Compared with the traditional technical solution for failure identification and replacement by the unit of the whole storage device, with the above example implementations, a potential failure may be identified in the partial area of the storage device and subsequent processing may be performed to the potential failed area at finer granularity.

Figure 4:
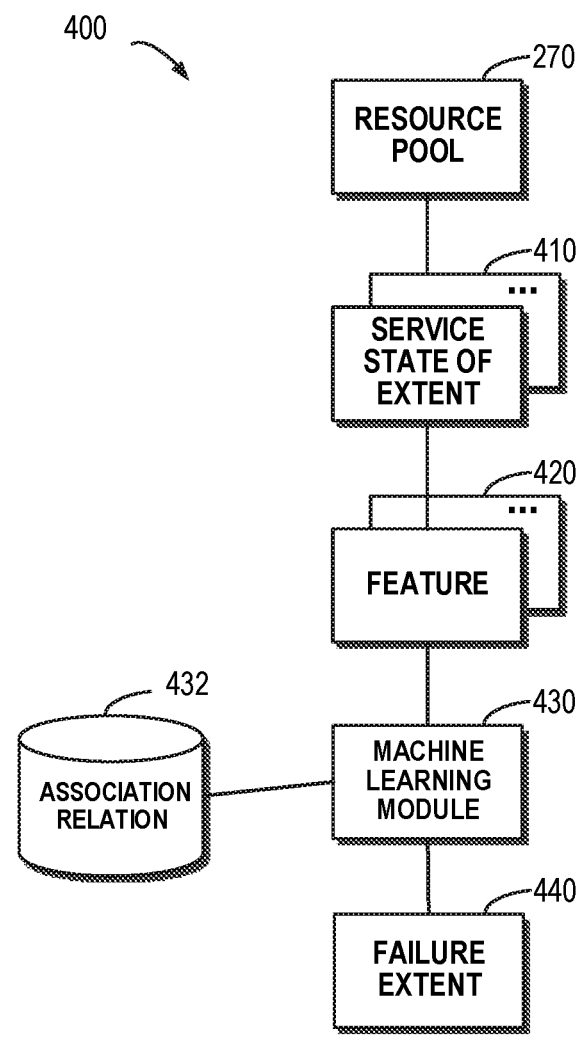
FIG. 4 schematically illustrates a block diagram for managing a storage system according to implementations of the present disclosure.

FIG. 4 schematically shows a block diagram 400 for managing a storage system according to implementations of the present disclosure. As depicted, extents in the storage system may come from storage devices 210 to 260 in the resource pool 270. During the running of the storage devices 210 to 260 in the resource pool 270, these storage devices may involve miscellaneous states, such as driver temperature, power on hours, allocated sectors counter, etc. Further, each of the storage devices 210 to 260 may comprise multiple extents. According to example implementations of the present disclosure, regarding multiple extents comprised in a storage device among the multiple storage devices, respective service states 410 of the multiple extents are obtained. It will be understood each extent may have a corresponding service state. Here the service state may include the above states of a storage device where the extent resides. Further, the service state may include a state of the extent itself, such as an address of the extent, whether the extent contains a failure, etc.

Where service states of various extents have been obtained, a respective feature 420 of each extent among the multiple extents may be determined on the basis of the respective service states 410 of the multiple extents. It will be understood the feature here refers to an indication descriptive of a current state of the extent. According to example implementations of the present disclosure, the feature may include multiple dimensions, and each dimension may represent one aspect of data in the service state. In a simple example, the feature 420 of the extent may be represented using a three-dimensional vector (address, temperature, failure or not). According to example implementations of the present disclosure, the feature may be represented using a more complex data structure.

As shown in FIG. 4, an association relation 432 between a failure in an extent in a storage device in the resource pool 270 and a feature of the extent may be obtained. It will be understood here that the association relation 432 may be determined on the basis of an extent in a specific model of storage device and historical experience regarding whether a failure occurs in the extent. In this implementation, the association relation 432 may be called using a machine learning module 430. Further, the machine learning module 430 may identify a failure extent in which a failure determined from multiple extents on the basis of the respective features 420 of the multiple extents and the association relation 432.

With the implementation shown in FIG. 4, it may be predicted on the basis of the association relation 432, which extent/extents in the storage devices 210 to 260 in the resource pool 270 might fail. According to example implementations of the present disclosure, a failure identifier of each extent may be obtained by scanning each extent. Suppose the feature 420 of the extent is represented using a three-dimensional vector (address, failure identifier, failure or not), and the association relation 432 defines when the failure identifier is a specific value, the extent faces the risk of failing. At this point, the extent whose failure identifier equals to a specific value may be identified as a failure extent.

Figure 5:
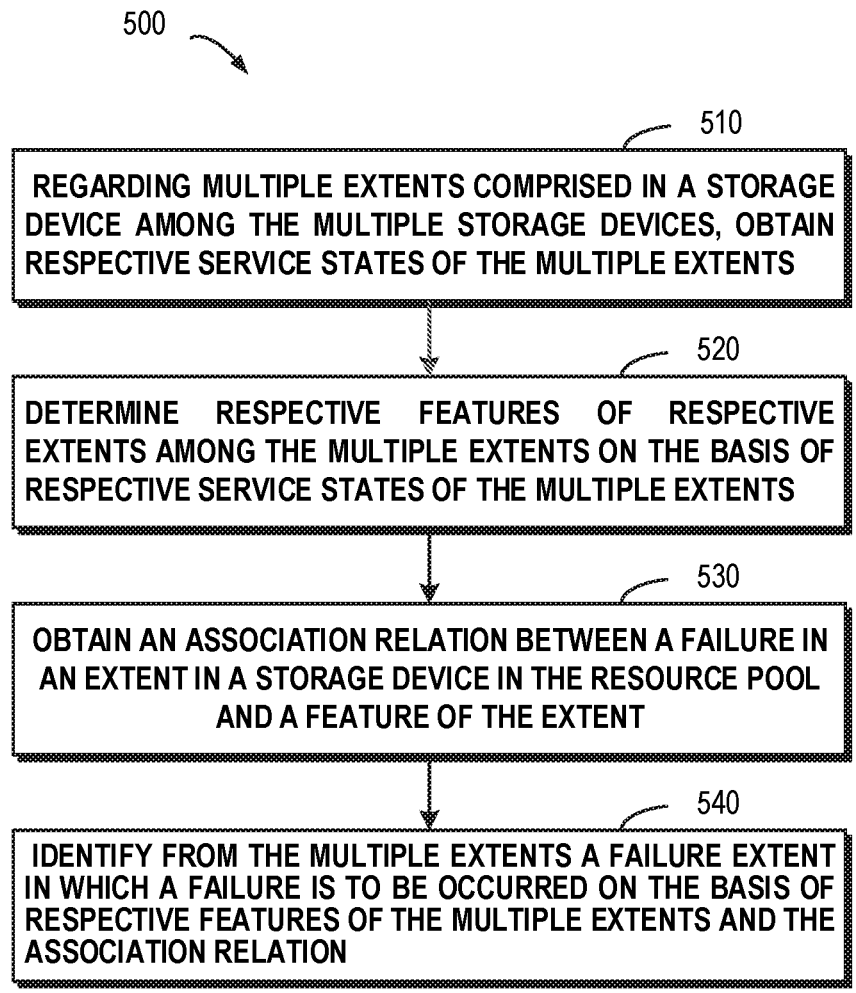
FIG. 5 schematically illustrates a flowchart of a method for managing a storage system according to implementations of the present disclosure.

Now that general description has been presented to implementations of the present disclosure with reference to FIG. 4, more details on how to manage a storage system will be described in detail with reference to FIG. 5. This figure schematically shows a flowchart 500 of a method for managing a storage system according to implementations of the present disclosure. At block 510, regarding multiple extents included in a storage device among multiple storage devices, respective service states 410 of the multiple extents are obtained. In the context of the present disclosure, the service state 410 may include multiple aspects, for example, may comprise state information of a storage device where an extent resides, and may further include state information of an extent itself.

According to example implementations of the present disclosure, the service state may include response time of each extent among the multiple extents towards an access request. It will be understood that since an area in the storage device might fail and, as such, an access request for the area may be delayed, response time for the area may be an important indicator representing whether a failure occurs in the storage device. On the basis of response time of each extent, a more accurate determination made be made about whether a failure occurs in each extent.

According to example implementations of the present disclosure, the service state further includes a failure identifier and failure information of each extent among the multiple extents. Usually a failure identifier of each extent in the storage device may be obtained by scanning the extent. Here the failure identifier may generally indicate whether a failure occurs in the area, whether the failure is recoverable, etc. Further, regarding different device providers, a dedicated field may further be defined to represent failure information associated with a certain model of storage device and for describing more details of the failure. With the above example implementations, miscellaneous information of the failure may be described at finer granularity, and further the type of the failure may be determined more accurately.

According to example implementations of the present disclosure, background media scans (BMS) may be performed to the storage device so as to obtain the service state. The background media scan is an approach for scanning a storage device to obtain a service state of each address field in the storage device. By scanning the storage device, a scan result for indicating the service state of the storage device may be obtained as shown in FIG. 6.

Figure 6:
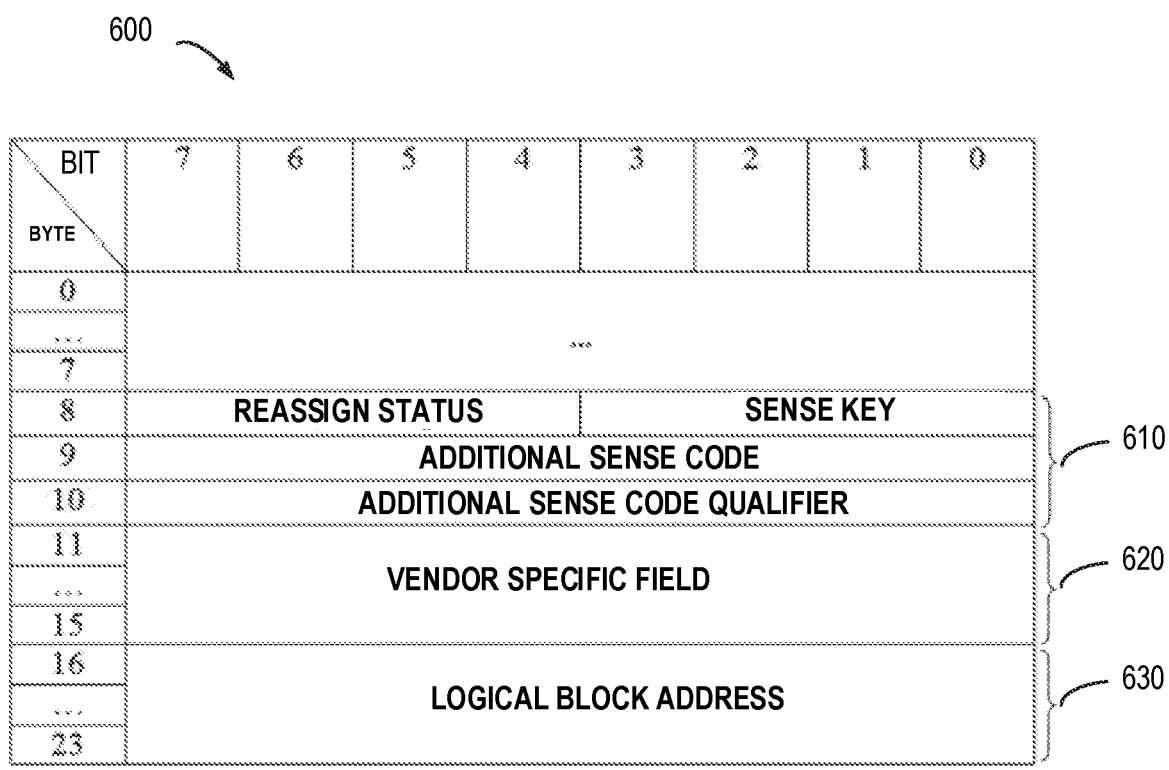
FIG. 6 schematically illustrates a block diagram of a scan result of performing background media scan to a storage device according to implementations of the present disclosure.

FIG. 6 schematically shows a block diagram of a scan result of performing background media scan to a storage device according to implementations of the present disclosure. In the scan result 600 shown in FIG. 6, a column represents a serial number of each byte in a data structure, and a row represents a serial number of each bit in one byte. As shown in FIG. 6, the $16^{th}$ to $23^{rd}$ bytes (as shown by a reference numeral 630) of the scan result 600 show a logical block address in the storage device, which address may identify a position of an extent. The $8^{th}$ to $10^{th}$ bytes (as shown by a reference numeral 610) of the scan result 600 show a failure identifier 610 of an extent at the logical block address 630. Specifically, the failure identifier 610 may further include: reassign status, sense key, additional sense code, additional sense code qualifier and other refined information. The $11^{th}$ to $15^{th}$ bytes (as shown by a reference numeral 620) of the scan result show a vendor specific field, which is defined by the vendor of the storage device so as to describe more information on the failure. Those skilled in the art may obtain specific definitions of the dimensions by referring to the definition of BMS.

Returning to FIG. 5, at block 520, a respective feature of each extent among the multiple extents may be determined on the basis of respective service states of the multiple extents. According to example implementations of the present disclosure, regarding a given extent among the multiple extents, a given feature of the given extent among the multiple extents is determined in response to response time of the given extent being higher than a predetermined threshold. Because the response time is a critical indicator indicating whether the extent has a potential failure, the subsequent operation to determine a feature may be triggered only in case of high response time. In this way, a failure extent may be detected more effectively.

According to example implementations of the present disclosure, a feature of each extent among the multiple extents may be determined one by one. Specifically, regarding a given extent, a given feature of the given extent may be determined on the basis of a failure identifier and failure information of the given extent. Because the failure identifier and the failure information are critical indicators indicating the failure, a failure extent may be determined more effectively and accurately with the above example implementations of the present disclosure. More details about the feature will be described with reference to FIG. 7.

Figure 7:
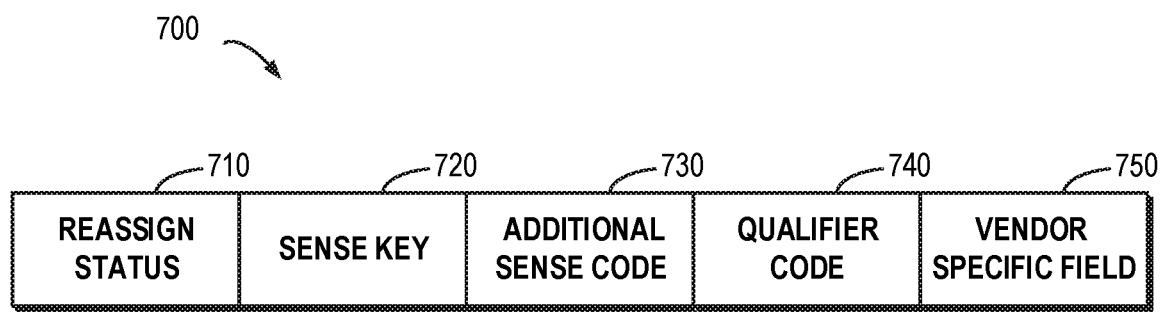
FIG. 7 schematically illustrates a block diagram of a feature of an extent according to implementations of the present disclosure.

FIG. 7 schematically shows a block diagram of a data structure 700 of a feature of an extent according to implementations of the present disclosure. As depicted, the feature may be represented using a vector, and each dimension in the vector may describe one aspect in the service state. According to example implementations of the present disclosure, the feature may comprise five dimensions: a reassign status 710, a sense key 720, an additional sense code 730, a qualifier code 740 and a vendor specific field 750. It will be understood FIG. 7 merely illustrates one example data structure 700 for representing the feature. According to example implementations of the present disclosure, there may be comprised other data structure. In one example, the vector for describing the feature may comprise more or less dimensions. For example, the vector may further include information on a storage device where an extent resides.

Referring back to FIG. 5, at block 530, an association relation 432 between a failure of an extent in a storage device in the resource pool 270 and a feature of the extent is obtained. According to example implementations of the present disclosure, the association relation may be trained on the basis of sample features of multiple sample extents in a group of sample storage devices and failures in the multiple sample extents. Machine learning technology has become a mature technical solution for processing various complicated problems. Here, on the basis of machine learning technology, the association relation 432 may be trained with sample features that cause failure extents and sample features that do not cause failure extents as obtained in historical operations. With the above example implementations, a more reliable basis may be provided for a subsequent operation to identify a failure extent.

It will be understood that the specific type of the association relation 432 is not intended to be limited in the context of the present disclosure, but the association relation 432 may be defined using various machine learning technology that is currently known or to be developed in future. According to example implementations of the present disclosure, the association relation 432 may be obtained on the basis of a neural network model. With the above example implementations, the obtained association relation 432 may describe with which feature an extent is failure prone. Therefore, the association relation may be used to predict which extents in other storage device might fail. In this way, extents in storage devices which might fail may be determined more accurately on the basis of historical experience.

At block 540, a failure extent 440 in which a failure is to be occurred is identified from the multiple extents on the basis of the respective features 420 of the multiple extents and the association relation 432. At this point, the feature of each extent may be inputted into a machine learning module 430, so that the machine learning module 430 may identify the failure extent 440 in which a failure is to be occurred on the basis of the association relation 432.

How to determine the failure extent 440 in the storage device has been described in detail with reference to FIGS. 4 to 7. After the failure extent 440 is determined, further processing may be performed to the failure extent 440, and thus data loss in the storage system may be avoided. According to example implementations of the present disclosure, data in the failure extent are rebuilt to a free extent other than the failure extent in the multiple storage devices. With the above example implementations, the reliability of the storage device may be increased, and further data loss in the storage system may be prevented.

It will be understood failures in the failure extent 440 may be subdivided into different failure levels. For example, failure levels may be defined on the basis of response time and/or other parameters in the failure identifier 610. According to example implementations of the present disclosure, when response time is used as a basis for defining failure levels, if response time grows longer, but read and write operations may still be completed in an acceptable time range, then it may be considered that the failure is a minor failure and may be processed at a lower priority. If response time grows longer and already reaches a "no response", then it may be considered that the failure is a major failure and should be processed at a higher priority.

According to example implementations of the present disclosure, for a minor failure, data in the failure extent 440 may be copied to a free extent. At this point, although response time of the failure extent 440 grows longer, read and write operations can still be performed to the failure extent 440, so data in the failure extent 440 may directly be copied to a normal extent. More details about the processing will be described with reference to FIGS. 8A and 8B below.

Figure 8A:
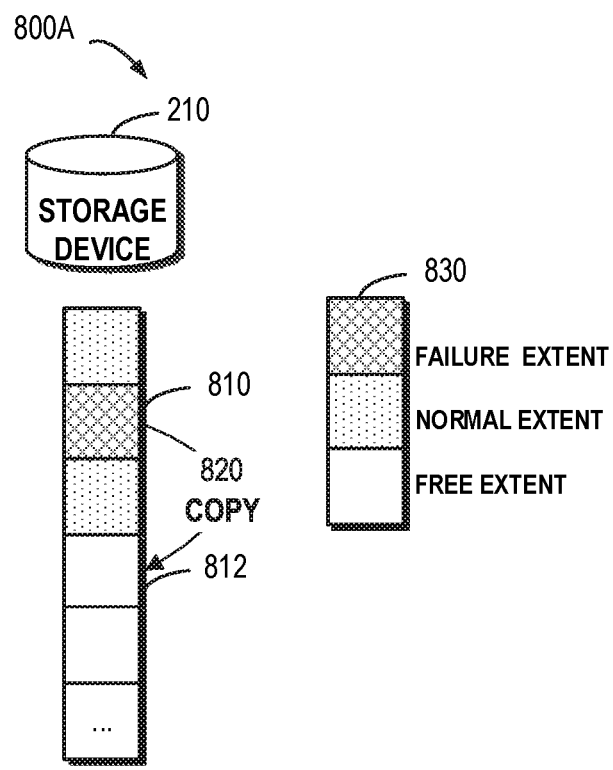
FIGS. 8A and 8B schematically illustrate a block diagram for rebuilding data in a failure extent to a free extent in a storage device in a resource pool on the basis of a copy operation according to implementations of the present disclosure.

FIG. 8A schematically shows a block diagram 800A for rebuilding data in a failure extent to a free extent in a storage device in a resource pool on the basis of a copy operation according to implementations of the present disclosure. In the figure, multiple extents included in a storage device 210 are illustrated below the storage device 210. A legend 830 at the right of FIG. 8A shows extents might have different states: a grid pattern shows a failure extent in the storage device as identified according to the above method, a shaded pattern shows a normal extent in the storage device, and a blank pattern shows a free extent which has not been allocated in the storage device.

As shown in FIG. 8A, suppose an extent 810 in the storage device 210 belongs to failure extents and an extent 812 belongs to free extents, at this point data in the failure extent 810 may be copied (as shown by an arrow 820) to the free extent 812. Further, the extent 810 may be marked as "failed" so as to indicate the extent 810 will not be used any more in subsequent operations of the resource pool 270. It will be understood since data copy within the same storage device is performed at fast speed, data in the failure extent may be copied to a free extent in the same storage device.

According to example implementations of the present disclosure, in view of other criterion, data in the failure extent may further be copied to a free extent residing on a different storage device. According to example implementations of the present disclosure, whether data in the failure extent are to be copied to a free extent in the storage device 210 may be determined on the basis of the number/proportion of failure extents in the storage device 210 where the failure extent resides. If a large number of failure extents exist in the storage device 210, then it may be considered that the whole storage device 210 will be confronted with a crash, so data in the failure extent may be copied to other storage device than the storage device 210.

According to example implementations of the present disclosure, whether data in the failure extent are to be copied to a free extent in the storage device 210 may be determined on the basis of a workload of the storage device 210 where the failure extent resides. If the workload of the storage device 210 is already heavy, then it may be determined that load balancing needs to be performed on various storage devices in the resource pool 270, and then data in the failure extent may be copied to a relatively lightly loaded storage device in the resource pool 270.

According to example implementations of the present disclosure, whether data in the failure extent are to be copied to a free extent in the storage device 210 may be determined on the basis of a free storage space in the storage device 210 wherein the failure extent resides. If the storage space of the storage device 210 is about to be exhausted, then the storage device 210 has no more capacity to provide more storage space, so data in the failure extent may be copied to other storage device having a sufficient free storage space in the resource pool 270.

Figure 8B:
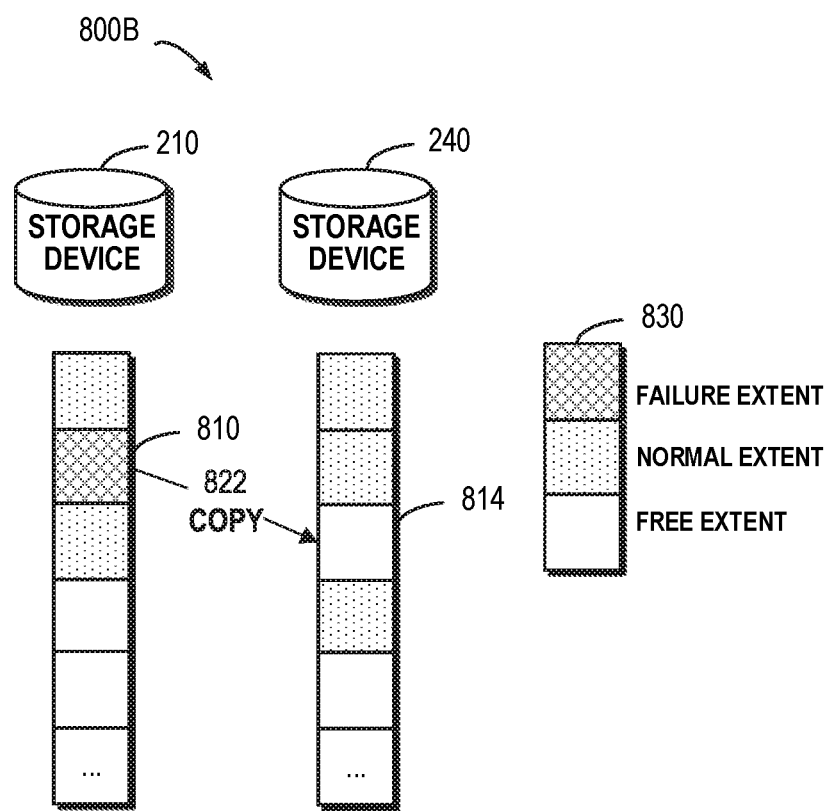

FIG. 8B schematically shows a block diagram 800B for rebuilding data in a failure extent to a free extent in other storage device in a resource pool on the basis of a copy operation according to implementations of the present disclosure. As depicted, suppose an extent 810 in a storage device 210 belongs to failure extents, and an extent 814 in a storage device 240 belongs to free extents. On the basis of the above criterion, data in the failure extent 810 may be copied (as shown by an arrow 822) to the free extent 814. Further, the extent 810 may be marked as "failed" so as to indicate the extent 810 will not be used any more in subsequent operations of the resource pool 270.

The rebuild of data in the failure extent on the basis of a copy operation has been described above. It will be understood when the storage system is a storage system having no redundant data, the rebuild operation may be performed on the basis of the method described with reference to FIGS. 8A and 8B. According to example implementations of the present disclosure, when the storage system does comprise redundant data, data in a failure extent may be recovered to a free extent on the basis of data in other extent associated with the failure extent in the storage system. Specifically, FIG. 9 schematically shows a block diagram 900 for rebuilding data in a failure extent to a free extent in a storage device in a resource pool on the basis of a recovery operation according to implementations of the present disclosure.

Figure 9:
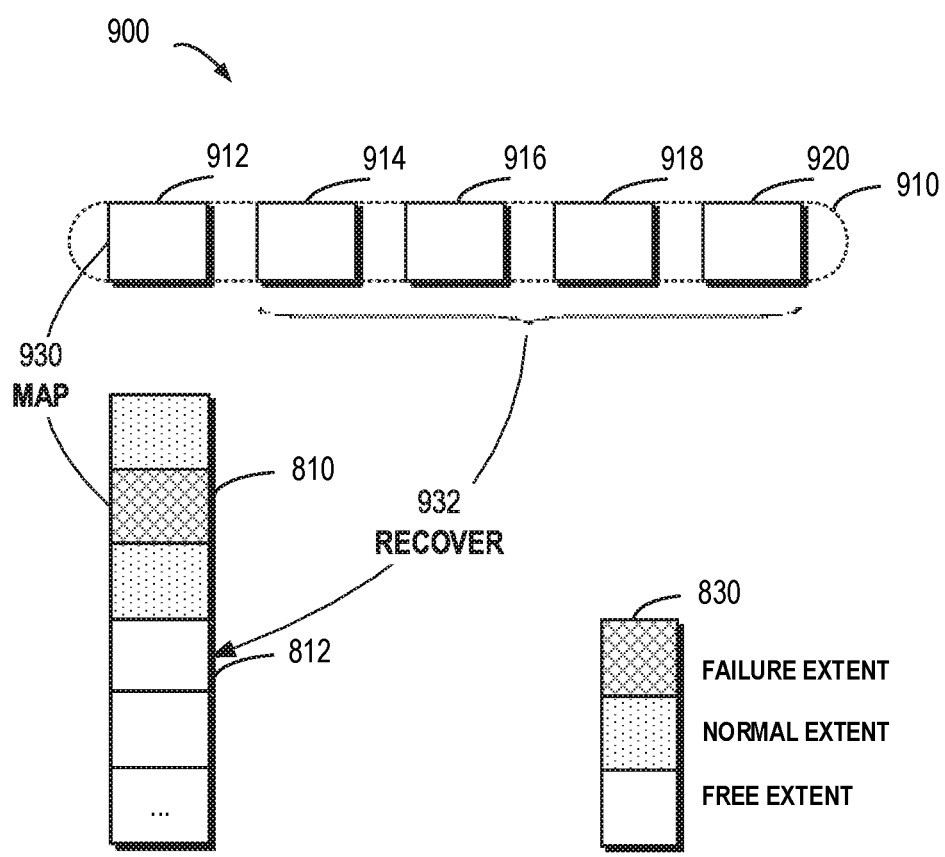
FIG. 9 schematically illustrates a block diagram for rebuilding data in a failure extent to a free extent in a storage device in a resource pool on the basis of a recovery operation according to implementations of the present disclosure.

FIG. 9 schematically shows a stripe 910 in a RAID storage system. The stripe 910 crosses multiple storage devices 210, 220, 230, 240 and 250 (which are not shown in FIG. 9 for the sake of brevity). Data stored in the stripe 910 comprise multiple extents: an extent 912 stored on the storage device 210, an extent 914 stored on the storage device 220, an extent 916 stored on the storage device 230, an extent 918 stored on the storage device 240, and an extent 920 stored on the storage device 250. In this example, the extents 912, 914, 916 and 918 are stored data, and the extent 920 is a P parity of stored data.

Suppose the extent 810 is determined as a failure extent, and as is clear from an address mapping 930 of the storage system, an actual storage position of the extent 912 is the extent 810. At this point, data in the failure extent 810 may be recovered to the free extent 812 (as shown by an arrow 932) on the basis of data in the extents 914, 916, 918 and 920 in the stripe 910. With the above example implementations, even where the failure extent has been seriously damaged and cannot be read or written to, data in the failure extent may be recovered on the basis of data in other extents in the stripe.

It will be understood where data in the failure extent have been recovered to other free extent, an address mapping that describes an association relation between an extent in the storage system and an extent in a storage device in the resource pool 270 needs to be updated. With the above example implementations, it may be guaranteed that a user may be guided to a correct address on the basis of the updated address mapping when accessing data in the storage system. Specifically, the address mapping of the storage system may be updated on the basis of an address of the free extent. In the example of FIG. 9, an address of the extent 810 in the address mapping may be replaced by an address of the extent 812.

According to example implementations of the present disclosure, in the running process of the resource pool 270, a resource allocation policy and a load balance policy may be adjusted on the basis of the identified failure extent 440. According to example implementations of the present disclosure, in response to receiving an allocation request for allocating a storage space in the resource pool 270, an extent is selected for allocation from free extents other than the failure extent in the resource pool 270. It will be understood the failure extent 440 will not only affect the response speed of the storage system but also exert an adverse impact on the data reliability in the storage system. Therefore, when allocating a storage resource, a free extent other than the failure extent will be selected for allocation, so as to ensure the storage system runs in a more reliable way.

It will be understood during the running of the resource pool 270, the number of storage devices in the resource pool 270 might change. For example, one or more new storage devices may be added to the resource pool 270, or one or more existing storage devices may be removed from the resource pool 270. According to example implementations of the present disclosure, in response to the number of storage devices in the resource pool 270 changing, a load balance may be performed to data in storage devices in the resource pool 270 on the basis of a position of the failure extent.

The addition of a storage device and the removal of a storage device will be discussed separately below. For the sake of description, first description is presented to the addition of a storage device to the resource pool 270. At this point, because the newly added storage device is a free storage device and each extent thereon is a free extent, data in the failure extent 410 in the storage devices 210 to 260 may be migrated to a free extent in the newly added storage device. Further, data in one part of normal extents in the storage devices 210 to 260 may be migrated to a free extent in the newly added storage device on the basis of the load balance principle.

When a specified storage device is removed from the resource pool 270, data in an allocated extent in the specified storage device may be migrated to a free extent in other storage device in the resource pool 270. It will be understood where the storage system is a RAID based storage system as described above, it needs to be guaranteed during the data migration that a position of each extent after the migration meets the requirement of the RAID storage system. In other words, it needs to be ensured various extents in one stripe reside on different storage devices.

During the operation of the resource pool 270, it is possible the user has not accessed data in some extents for a long time, and when the user re-accesses data, an extent might have failed and, as such, data cannot be recovered from the extent. Such a circumstance may be referred to as a silent error. In order to prevent the occurrence of a silent error in a storage device in the resource pool 270, extents in each storage device may be scanned regularly. Because an extent identified as a failure extent might have a higher risk, after the failure extent is determined by the above method, the failure extent 440 may be scanned at higher frequency. During the scanning, when it is found that the read time is higher than a predetermined time threshold, data in the failure extent 440 may be rebuilt to a free extent other than the failure extent in the multiple storage devices. In this way, the deterioration of the failure extent 440 may be detected in a more timely way, and further data in the failure extent 440 may be migrated in advance before the occurrence of an unrecoverable failure.

While examples of the method according to the present disclosure have been described in detail with reference to FIGS. 2 to 9, description is presented below to the implementation of a corresponding apparatus. According to example implementations of the present disclosure, provided is an apparatus for managing a storage system, extents in the storage system being from multiple storage devices in a resource pool associated with the storage system. The apparatus comprises: a state obtaining module configured to, regarding multiple extents comprised in a storage device among the multiple storage devices, obtain respective service states of the multiple extents; a determining module configured to determine respective features of respective extents among the multiple extents on the basis of respective service states of the multiple extents; a relation obtaining module configured to obtain an association relation between a failure in an extent in a storage device in the resource pool and a feature of the extent; and an identifying module configured to identify from the multiple extents a failure extent in which a failure is to be occurred on the basis of respective features of the multiple extents and the association relation.

According to example implementations of the present disclosure, the service state comprises response time of respective extents among the multiple extents for an access request, and the determining module is further configured to, regarding a given extent among the multiple extents, determine a given feature of the given extent among the multiple extents in response to response time of the given extent being higher than a predetermined threshold.

According to example implementations of the present disclosure, the service state further comprises respective failure identifiers and failure information of respective extents among the multiple extents, and the determining module is further configured to, regarding the given extent, determine a given feature of the given extent on the basis of a failure identifier and failure information of the given extent.

According to example implementations of the present disclosure, the relation obtaining module is further configured to train the association relation on the basis of features of multiple extents in a group of storage devices and failures of the multiple extents in the group of storage devices.

According to example implementations of the present disclosure, the state obtaining module is further configured to perform background media scan to the storage device so as to obtain the service state.

According to example implementations of the present disclosure, the apparatus further comprises a processing module, which is configured to: rebuild data in the failure extent to a free extent other than the failure extent in the multiple storage devices; and update an address mapping of the storage system on the basis of an address of the free extent, the address mapping describing an association relation between an extent in the storage system and an extent in a storage device in the resource pool.

According to example implementations of the present disclosure, the processing module is configured to: copy data in the failure extent to the free extent; and recover the data in the failure extent to the free extent on the basis of data in other extent associated with the failure extent in the storage system.

According to example implementations of the present disclosure, the processing module is configured to: select an extent for allocation from free extents other than the failure extent in the resource pool in response to receiving an allocation request for allocating a storage space from the resource pool.

According to example implementations of the present disclosure, the processing module is configured to: perform a load balance to data in storage devices in the resource pool on the basis of a position of the failure extent in response to the number of storage devices in the resource pool changing.

According to example implementations of the present disclosure, the processing module is configured to: periodically read data in the failure extent; and rebuild data in the failure extent to a free extent other than the failure extent in the multiple storage devices in response to read time being higher than a predetermined time threshold.

Figure 10:
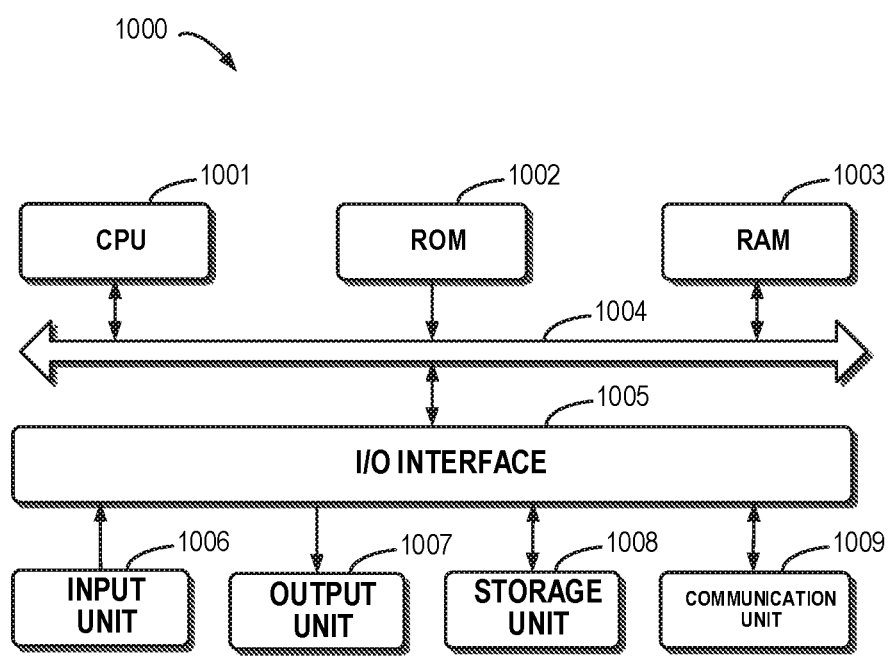
FIG. 10 schematically illustrates a block diagram of an apparatus for managing a storage system according to example implementations of the present disclosure.

FIG. 10 schematically shows a block diagram of an apparatus 1000 for managing a storage system according to example implementations of the present disclosure. As depicted, the apparatus 1000 includes a central process unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the apparatus 1000. CPU 1001, ROM 1002 and RAM 1003 are connected to each other via a bus 1004. The input/output (I/O) interface 1005 is also connected to the bus 1004.

A plurality of components in the apparatus 1000 is connected to the I/O interface 1005, including: an input unit 1006, such as keyboard, mouse and the like; an output unit 1007, e.g., various kinds of display and loudspeakers etc.; a storage unit 1008, such as magnetic disk and optical disk etc.; and a communication unit 1009, such as network card, modem, wireless transceiver and the like. The communication unit 1009 allows the apparatus 1000 to exchange information/data with other devices via the computer network, such as Internet, and/or various telecommunication networks.

The above described each process and treatment, such as the method 500, can also be executed by the processing unit 1001. For example, in some implementations, the method 500 can be implemented as a computer software program tangibly included in the machine-readable medium, e.g., the storage unit 1008. In some implementations, the computer program can be partially or fully loaded and/or mounted to the apparatus 1000 via ROM 1002 and/or the communication unit 1009. When the computer program is loaded to the RAM 1003 and executed by the CPU 1001, one or more steps of the above described method 500 can be implemented. Alternatively, in other implementations, the CPU 1001 also can be configured in other suitable manners to realize the above procedure/method.

According to example implementations of the present disclosure, there is provided an apparatus for managing a storage system, extents in the storage system being from multiple storage devices in a resource pool associated with the storage system. The apparatus comprises: at least one processor; a volatile memory; and a memory coupled to the at least one processor, the memory having instructions stored thereon, the instructions, when executed by the at least one processor, causing the apparatus to perform acts. The acts include: regarding multiple extents comprised in a storage device among the multiple storage devices, obtaining respective service states of the multiple extents; determining respective features of respective extents among the multiple extents on the basis of respective service states of the multiple extents; obtaining an association relation between a failure in an extent in a storage device in the resource pool and a feature of the extent; and identifying from the multiple extents a failure extent in which a failure is to be occurred on the basis of respective features of the multiple extents and the association relation.

According to example implementations of the present disclosure, the service state comprises response time of respective extents among the multiple extents for an access request, and determining respective features of respective extents among the multiple extents comprises: regarding a given extent among the multiple extents, determining a given feature of the given extent among the multiple extents in response to response time of the given extent being higher than a predetermined threshold.

According to example implementations of the present disclosure, the service state further comprises respective failure identifiers and failure information of respective extents among the multiple extents, and determining respective features of respective extents among the multiple extents comprises: regarding the given extent, determining a given feature of the given extent on the basis of a failure identifier and failure information of the given extent.

According to example implementations of the present disclosure, obtaining the association relation comprises: training the association relation on the basis of features of multiple extents in a group of storage devices and failures of the multiple extents in the group of storage devices.

According to example implementations of the present disclosure, obtaining respective service states of the multiple extents comprises: performing background media scan to the storage device so as to obtain the service state.

According to example implementations of the present disclosure, the acts further comprise: rebuilding data in the failure extent to a free extent other than the failure extent in the multiple storage devices; and updating an address mapping of the storage system on the basis of an address of the free extent, the address mapping describing an association relation between an extent in the storage system and an extent in a storage device in the resource pool.

According to example implementations of the present disclosure, rebuilding data in the failure extent to the free extent comprises at least one of: copying data in the failure extent to the free extent; and recovering the data in the failure extent to the free extent on the basis of data in other extent associated with the failure extent in the storage system.

According to example implementations of the present disclosure, the acts further comprise: selecting an extent for allocation from free extents other than the failure extent in the resource pool in response to receiving an allocation request for allocating a storage space from the resource pool.

According to example implementations of the present disclosure, the acts further comprise: performing a load balance to data in storage devices in the resource pool on the basis of a position of the failure extent in response to the number of storage devices in the resource pool changing.

According to example implementations of the present disclosure, the acts further comprise: periodically reading data in the failure extent; and rebuilding data in the failure extent to a free extent other than the failure extent in the multiple storage devices in response to read time being higher than a predetermined time threshold.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

I claim:

1. A method for managing a storage system, the method comprising:
    obtaining service states for multiple extents in a storage device in a resource pool, wherein a service state of the services states comprises a response time for an access request of an extent of the multiple extents;
    determining, using the service states, a plurality of features for the multiple extents;
    obtaining an association relation between a failure in an extent and a feature of the extent; and
    identifying a failure extent from the multiple extents based on the plurality of features and the association relation.

2. The method of claim 1,
    wherein the service state further comprises a failure identifier and failure information of the extent.

3. The method of claim 1, wherein obtaining the association relation comprises:
    training the association relation using the plurality of features.

4. The method of claim 1, wherein obtaining the service states of the multiple extents comprises:
    performing a background media scan on the storage device to obtain the service states.

5. The method of claim 1, further comprising:
    rebuilding data in the failure extent to a free extent other than the failure extent in the multiple storage devices; and
    updating an address mapping of the storage system on the basis of an address of the free extent.

6. The method of claim 5, wherein rebuilding data in the failure extent to the free extent comprises at least one of:
    copying data in the failure extent to the free extent; and
    recovering the data in the failure extent to the free extent on the basis of data in at least one other extent associated with the failure extent in the storage system.

7. The method of claim 1, further comprising:
    selecting an extent for allocation from free extents in the resource pool in response to receiving an allocation request for allocating a storage space from the resource pool, wherein the extent for allocation is not the failure extent.

8. The method of claim 1, further comprising:
    performing load balancing in the resource pool on the basis of a position of the failure extent in response to a number of storage devices in the resource pool changing.

9. The method of claim 1, further comprising:
    periodically reading data in the failure extent; and
    rebuilding data from the failure extent to a free extent other than the failure extent in response to read time for the failure extent being higher than a predetermined time threshold.

10. An apparatus for managing a storage system, the apparatus comprising:
    at least one processor;
    a volatile memory; and
    a memory coupled to the at least one processor and having instructions stored thereon, the instructions, when executed by the at least one processor, causing the apparatus to perform a method, the method comprising:
        obtaining service states for multiple extents in a storage device in a resource pool, wherein a service state of the services states comprises a response time for an access request of an extent of the multiple extents;
        determining, using the service states, a plurality of features for the multiple extents;
        obtaining an association relation between a failure in an extent and a feature of the extent; and
        identifying a failure extent from the multiple extents based on the plurality of features and the association relation.

11. The apparatus of claim 1,
    wherein the service state further comprises a failure identifier and failure information of the extent.

12. The apparatus of claim 10, wherein obtaining the association relation comprises:
    training the association relation using the plurality of features.

13. The apparatus of claim 10, wherein obtaining the service states of the multiple extents comprises:
    performing a background media scan on the storage device to obtain the service states.

14. The apparatus of claim 10, wherein the method further comprises:
    rebuilding data in the failure extent to a free extent other than the failure extent in the multiple storage devices; and
    updating an address mapping of the storage system on the basis of an address of the free extent.

15. The apparatus of claim 14, wherein rebuilding data in the failure extent to the free extent comprises at least one of:
    copying data in the failure extent to the free extent; and
    recovering the data in the failure extent to the free extent on the basis of data in at least one other extent associated with the failure extent in the storage system.

16. The apparatus of claim 10, wherein the method further comprises:
    selecting an extent for allocation from free extents in the resource pool in response to receiving an allocation request for allocating a storage space from the resource pool, wherein the extent for allocation is not the failure extent.

17. The apparatus of claim 10, wherein the method further comprises:
  performing load balancing in the resource pool on the basis of a position of the failure extent in response to a number of storage devices in the resource pool changing.

18. A computer program product, tangibly stored on a non-transitory computer readable medium and comprising machine executable instructions which are used to implement a method, the method comprising:
  obtaining service states for multiple extents in a storage device in a resource pool, wherein a service state of the services states comprises a response time for an access request of an extent of the multiple extents;
  determining, using the service states, a plurality of features for the multiple extents;
  obtaining an association relation between a failure in an extent and a feature of the extent; and
  identifying a failure extent from the multiple extents based on the plurality of features and the association relation.

* * * * *

UNITED STATES PATENT AND TRADEMARK OFFICE
CERTIFICATE OF CORRECTION

PATENT NO. : 11,036,587 B2
APPLICATION NO. : 16/284562
DATED : June 15, 2021
INVENTOR(S) : Bing Liu It is certified that error appears in the above-identified patent and that said Letters Patent is hereby corrected as shown below:

In the Claims

Column 17, Line 33 Claim 1, the word "services" should read -- service --.

Column 18, Line 26 Claim 10, the word "services" should read -- service --.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*